United States Patent
Dolan et al.

(10) Patent No.: US 6,283,274 B1
(45) Date of Patent: Sep. 4, 2001

(54) CAM TENSIONER FOR SCRAPER BLADE ASSEMBLIES

(76) Inventors: Troy D. Dolan, R.D. 3, Box 497D; Joseph Gibson, Box 307, Blacklick Rd., both of Blairsville, PA (US) 15717

(*) Notice: Subject to any disclaimer, the term of this patent is extended or adjusted under 35 U.S.C. 154(b) by 0 days.

(21) Appl. No.: 09/470,107

(22) Filed: Dec. 22, 1999

Related U.S. Application Data
(60) Provisional application No. 60/090,679, filed on Jun. 25, 1998.

(51) Int. Cl.[7] .................................................. B65G 47/12
(52) U.S. Cl. ................................. 198/499; 15/256.5
(58) Field of Search .................... 198/497, 499; 15/256.5, 256.6

(56) References Cited

U.S. PATENT DOCUMENTS

| | | |
|---|---|---|
| 3,631,968 | 1/1972 | Ward ..................................... 198/230 |
| 4,352,425 | 10/1982 | Childress et al. ..................... 198/499 |
| 4,359,150 | 11/1982 | Bowman et al. ...................... 198/497 |
| 4,533,035 | 8/1985 | Reiter ................................... 198/499 |
| 4,633,999 | 1/1987 | Perneczky ............................. 198/499 |
| 4,917,231 | 4/1990 | Swinderman ......................... 198/497 |
| 4,936,439 | 6/1990 | Alexander, Jr. et al. ............. 198/499 |
| 5,114,000 | 5/1992 | Rappen ................................. 198/499 |

*Primary Examiner*—Kenneth W. Noland
(74) *Attorney, Agent, or Firm*—The Bilicki Law Firm, P.C.

(57) ABSTRACT

The present invention describes a tensioner that automatically increases the effective torque on the support arm over time. The tensioner is comprised of a torsion cam engaging the support arm of the scraper blade assembly, a torsion cable engaging the cam, a tension rod with a spring surrounding the rod secured to the torsion cable. Over time, as the scraper blade wears down and the spring force decreases, the torsion cam is slowly rotated to increase the torque arm of the invention and thereby increase the effective torque on the support arm and compensate for the decrease in spring force. This invention may be adapted for use with any existing scraper blade assembly.

15 Claims, 8 Drawing Sheets

| POINT LOCATION | TORQUE ARM | TORQUE ARM +0.125 | SPRING FORCE | EFFECTIVE TORQUE |
|---|---|---|---|---|
| A | 2.446'" | 2.571" | 537.0 | 1381 |
| B | 2.695'" | 2.820" | 512.8 | 1446 |
| C | 2.895'" | 3.020" | 488.6 | 1476 |
| D | 3.083'" | 3.208" | 464.4 | 1490 |
| E | 3.278'" | 3.403" | 440.2 | 1498 |

CAM TENSIONER FOR SCRAPER BLADE ASSEMBLIES

This patent application claims priority to U.S. Provisional Patent Application, Ser. No. 60/090,679 filed on Jun. 25, 1998.

FIELD OF THE INVENTION

This invention relates generally to an apparatus for the cleaning of material handling conveyor belts. The invention relates specifically to an apparatus for increasing, over time, a biasing of force exerted by a scraper blade against a conveyor belt.

BACKGROUND OF THE INVENTION

Conveyors are used extensively to transport materials, such as sand, gravel and coal, from one location to another. Continuous conveyor belts are often used to efficiently, effectively, and continuously transport material. It is a problem that with continuous conveyor belts that material often adheres to the conveyor belt, due to moisture and other conditions, after the material has passed the intended delivery point. Material that remains on the belt can interfere with the proper functioning of the conveyor system by way of increased wear and tear on the conveyor belt and damage to the rollers supporting the belt on the return section of the continuous loop.

Several devices disclose the use of scraper blades to remove materials that have adhered to the conveyor belt. These devices are effective for a period of time, but only with frequent adjustments or tensioning throughout the entire wear life of the scraper blades. Scraper blades tend to wear over time; typically, in one to one and a half years, the scraper blades need to be replaced. As the scraper blades wear down, several phenomena occur. Firstly, the surface area of the blade that is in contact with the conveyor belt increases as the blade wears. Secondly, the biasing force of the support arm of the blade against the belt diminishes over time, thereby causing insufficient biasing of the blade against the belt. Thirdly, the arm that biases the blades against the belt must be adjusted so as to enable the blades to exert sufficient force against the belt as the blade wears. Otherwise, the blades do not remain biased against the conveyor belt with sufficient force to permit the effective scraping of material from the belt. Typically, the support arm is adjusted manually to bias the blade against the belt. Manual adjustment of the support arm requires shutting down the conveyor line. As the blades wear, more frequent adjustment of the support arm is necessary. As one can readily appreciate, frequent intermittent manual adjustment of the arm results in downtime and efficiencies. Moreover, even frequent adjustment of the support arm does not adequately compensate for the continuous wearing of the blades.

Thus, a tensioner is needed to overcome the continuous loss of biasing force such that the biasing force of the arm and blade against the belt remains sufficient, as the blade(s) wear, so as to permit effective cleaning of the belt. Also needed is a tensioner with a useful life at least as long as the useful life of the scraper blade(s). Further, a self-adjusting tensioner is needed which compensates for the wearing of the scraper blade and corresponding loss of biasing force in the arm and blade, with virtually no manual adjustment of the support arm, such that the use of the scraper and tensioner remains substantially uninterrupted.

SUMMARY OF THE INVENTION

The present invention is directed to a tensioner that automatically increases the effective torque on the support arm over time. The tensioner is comprised of a torsion cam, torsion cable, tension rod, and spring. The tensioner is coupled to a scraper blade support arm. As the scraper blade wears down, the spring expands away from the mounting plate. As it expands, the spring exerts a force against a spring retainer to which is secured one end of the tension rod, thereby causing the tension rod to move away from the mounting plate. The other end of the tension rod is secured to a first pin member to which is secured a cable at one end. The opposite end of the cable is also secured to a second pin member, which, in turn, is secured to a torsion cam. Movement of the spring and torsion rod away from the mounting plate causes the cable to be pulled in the direction of the movement of the torsion rod. As the cable is pulled, at the first pin member, by virtue of the cable's engaging the torsion cam, the torsion cam rotates, about its axis of rotation, in a clockwise direction. As the torsion cam rotates, the length of the torque arm (i.e., the distance between a point on the axis of rotation co-terminus with the end of the torsion cam opposite the mounting plate and the intersection point of the cable as it leaves the torsion cam) increases. As the length of the torque arm increases, the effective torque on the support arm increases, thereby causing the biasing force of the support arm and blades against the belt to increase. In a preferred embodiment, this invention is particularly suited for use with a scraper assembly such as the one disclosed in U.S. patent application Ser. No. 08/818,839, entitled, "Method and Apparatus for Cleaning a Conveyor Belt". However, as one of ordinary skill in the art will readily appreciate, the tensioner of the instant invention can be adapted for use with virtually any existing scraper blade assembly.

It is an object of the subject invention to provide a device that automatically increases the effective torque on the support arm of the scraper blade, thereby increasing the biasing force of the support arm (and scraper blade) against the conveyor belt.

It is also an object of the subject invention to provide a system that requires no manual adjustment or tensioning throughout the entire wear life of the scraper blades and spring.

It is a further object of the subject invention to provide a tensioner that is universally mountable to any existing scraper assembly and can be retrofitted to a wide range of other tensioners.

The apparatus of the present invention is further illustrated by the following detailed description and accompanying drawings.

BRIEF DESCRIPTION OF THE DRAWINGS

FIG. 6 also includes a chart depicting torque arm length, spring force and effective torque as measured at data points A, B, C, D, and E.

DETAILED DESCRIPTION OF THE PREFERRED EMBODIMENT

Figure 1:
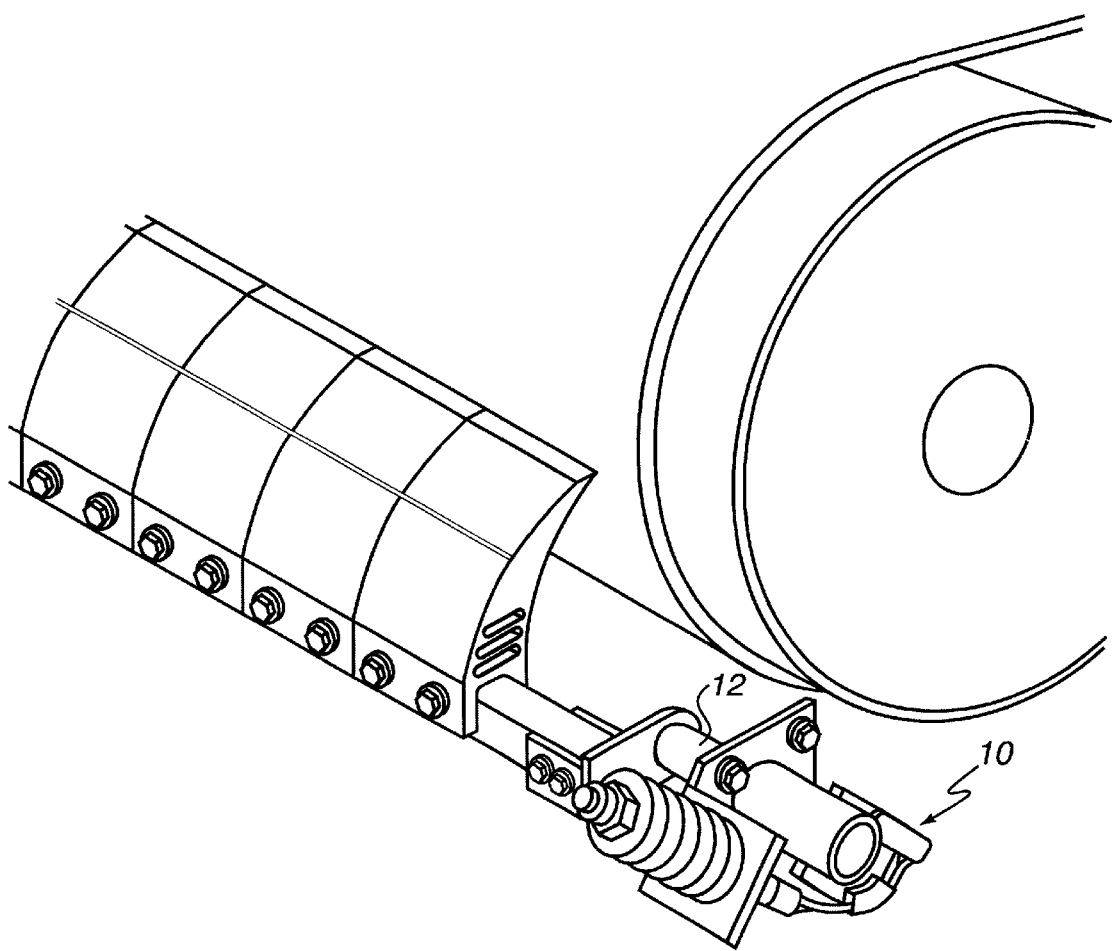
FIG. 1 is side elevational view of a preferred embodiment of the tensioner.

During the normal life of a scraper blade assembly, the scraper blades wear down over time. Specifically, the portion of the blade in contact with the belt becomes more blunt. That is to say that the total surface area of the blade in contact with the belt increases as the blade wears. Typical biasing devices include devices that bias the support arm and blade against the conveyor belt However, as the scraper blade wears down thereby creating a greater surface area in contact with the belt, these devices cannot effectively maintain the bias of the arm and blade against the conveyor belt. Over time, as the devices lose effectiveness, the biasing force diminishes and the devices lose the capability to continue to bias the support arm against the conveyor belt. Without this proper biasing of the support arm and blade against the conveyor belt, the scraper blades can not effectively scrape the material from the conveyor belt as the blade wears and the biasing force diminishes.

The subject invention is a cam tensioner that is used to bias a support arm and scraper blade against a conveyor belt. The invention comprises a torsion cam, a torsion cable, a tension rod, and a spring. As the scraper blades wear down, creating a greater surface area in contact with the belt, more biasing force is needed from the support arm to keep the blades in contact with the belt. As the blade continues to wear, the arm's biasing force diminishes. This diminishing in force is especially problematic when the scraper blade assembly automatically adjusts to variations in the conveyor belt, such as the type of scraper blade assembly described in U.S. patent application Ser. No. 08/818,839. The cam tensioner of the subject invention compensates for this phenomenon. Specifically, the torsion cam will be rotated through a portion of a three hundred and sixty degree circle in the time that it takes for typical scraper blades to wear out. In a preferred embodiment, the portion of the circle is an arc of approximately thirty (30) to thirty-five (35) degrees, although this distance can vary, depending on the length of time it takes the blade to wear.

The spring of the subject invention is compressed when originally mounted and secured to the tension rod. The spring is fixedly secured to the end of the tension rod that is opposite the rod's connection to the torsion cable. In a preferred embodiment, spring retainers surround the tension rod at opposite ends of the tension rod such that the spring is located in between the spring retainers and such that the tension rod may slide easily through the spring retainers. Over time, the spring will expand against the spring retainers. The expansion of spring forces the tension rod up and away from its connection to the torsion cable. This force on the tension rod results in a pulling force on the torsion cable. While the torsion cable may have a small amount of flexibility, it is important for the torsion cable to be substantially rigid so that the torsion cable does not stretch in response to the forces exerted on it by the tension rod. The pulling force on the torsion cable will cause the torsion cam to rotate in a clockwise or counter-clockwise manner, dependent on the side of the scraper assembly to which the cam tensioner is mounted, because of the connection of the torsion cable to the torsion cam. This rotation by the torsion cam, which is secured to the support arm of the scraper blade assembly, causes the support arm to rotate toward the conveyor belt, thus biasing the arm and blades against conveyor belt and increasing the effective torque of the arm against the conveyor belt. In the most preferred embodiment, a cam tensioner is placed at both ends of the support arm of the scraper blade assembly. However, a single cam tensioner placed at either end of the scraper blade assembly will increase the effective torque and, thus, accomplish the stated purpose of the subject invention.

It should be understood by the reader that the drawings should be read together with the specification and are considered a portion of the entire written description of the invention. In addition, for the ease of the reader, like reference numerals on different figures refer to identical elements of the invention.

With reference to the drawings, the cam tensioner (10) is mounted to the scraper blade assembly as shown in FIG. 1 and operatively connected so that the torsion cam of the subject invention engages the support arm of the scraper blade assembly. The scraper blade assembly depicted in FIG. 1 is one of many types of scraper blade assemblies that may be used with the subject invention. FIG. 1 illustrates the arrangement a preferred embodiment of the cam tensioner with the preferred scraper blade assembly.

Figure 3:
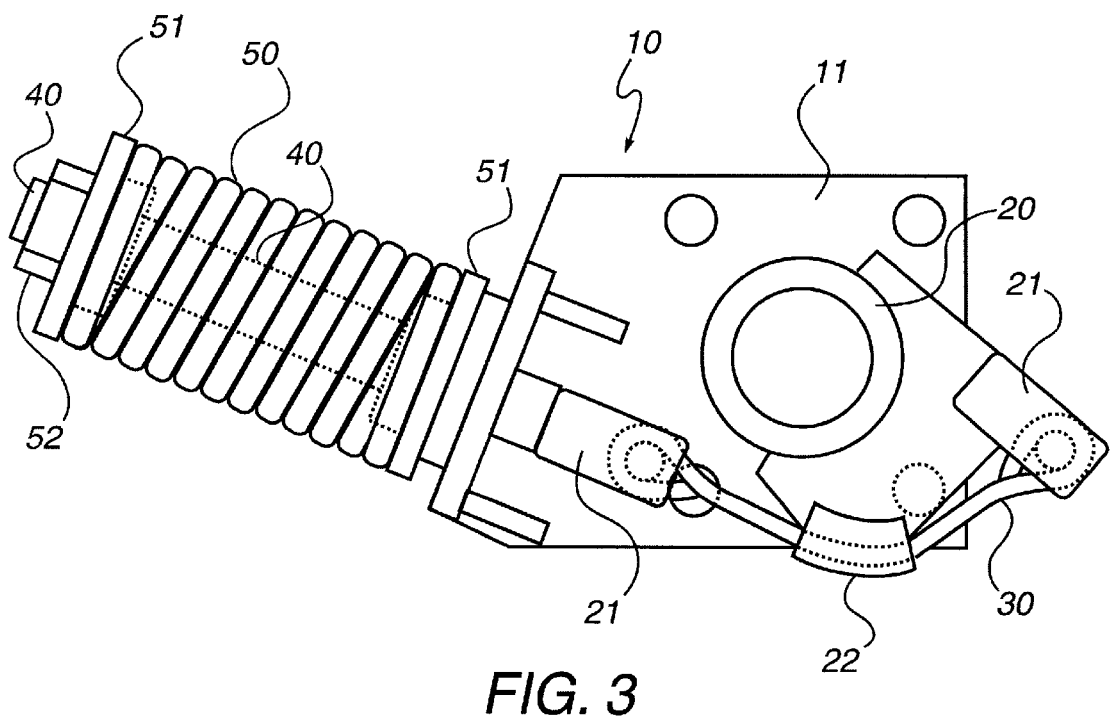
FIG. 3 is a side view of a preferred embodiment of the tensioner.

FIG. 3 illustrates the arrangement of the elements of the subject invention. The torsion cam (20) is fixedly secured to the support arm (12) of the scraper blade assembly so the arm and the torsion cam will rotate together. The mounting plate also acts as a large bearing for the support arm (12) which extends through the mounting plate. The securing of the cam to the support arm can be accomplished in any number of ways that will allow the simultaneous movement of the arm and cam. In the preferred embodiment, the torsion cam (20) is set screwed to the support arm of the scraper blade assembly. The mounting plate (11) may already be a part of the scraper blade assembly. It should be recognized that many different types of mounting plates exist. To fit the subject invention to any of the mounting plates, changes in the length of the torsion cable or changes to the length of the tension rod must be made, depending on the shape and size of the mounting plate. The mounting plate also provides a shelf upon which the spring (50) of the subject invention may be mounted.

In a preferred embodiment, the torsion cam (20) is made primarily of two shaped portions (23 and 24) that will rotate in unison to provide the effects described herein. It is apparent that a unitary piece or any number of pieces can be utilized to accomplish the same goal. In the preferred embodiment, the first portion or shaft (24) of the torsion cam is cylindrical in shape (24). The shaft portion (24) is integral with the second piece or flange portion (23) that is generally in the shape of a rectangle. The flange portion (23) is molded on one side to fit with the first piece. On the bottom of the rectangle, the flange portion is curved from the midpoint of the bottom piece to where the bottom meets the opposite side of the rectangle. The side of the rectangle that is opposite to the molded side is angled toward the molded side to join with the bottom side. In addition, in the preferred embodiment, the torsion cam (20) utilizes two types of cable engaging members, a guide member (22) and a pin member (21), to engage and secure the torsion cable. It should be apparent that any number of securing methods may be used to secure the torsion cable to the torsion cam. In the preferred embodiment, the torsion cam and its related elements are made of carbon steel; however, it should be obvious that many other types of materials may be used, including, but not limited to, other types of metal or types of plastic or polyurethane.

Figure 2:
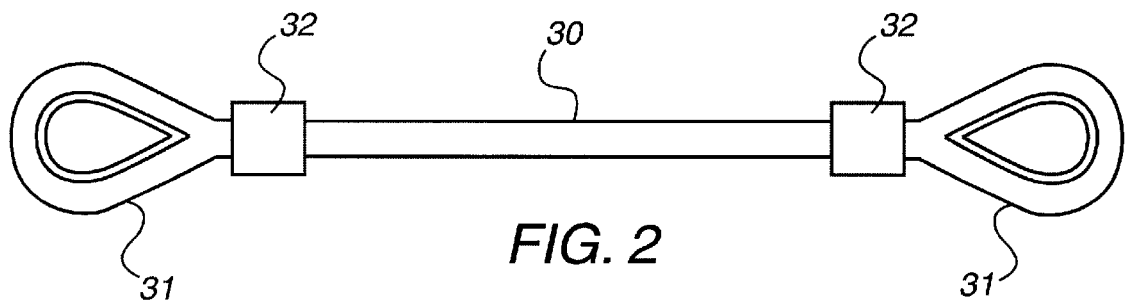
FIG. 2 is a detailed side view of a preferred embodiment of the torsion cable.

In the preferred embodiment of the torsion cable (30), with respect to FIG. 2, the torsion cable has two (2) looped ends (31). One looped end (31) is placed over one of the pin securing members (21). The torsion cable (30) is wrapped around the curved portion of the second piece of the torsion cam and held in place along the curve by the guide member (22). The second of the pin securing members (21) is fixedly attached to the tension rod (40). The second looped end (31) of the torsion cable is placed over the second of the pin securing members (21). In a more preferred embodiment, the torsion cable includes two (2) compression sleeves (32) attached to the torsion cable at or near the juncture of the looped ends. In the preferred embodiment, the torsion cable is made of stainless steel; however, it should be obvious that many other types of materials may be used, including, but not limited to, other types of metal or types of plastic or polyurethane. It should also be obvious to one skilled in the art that many different means of attaching the cable to the pin securing members may be used, including but not limited to methods of securing such as providing a ball and socket joint or brazing the cable to the pin securing members.

Figure 4:
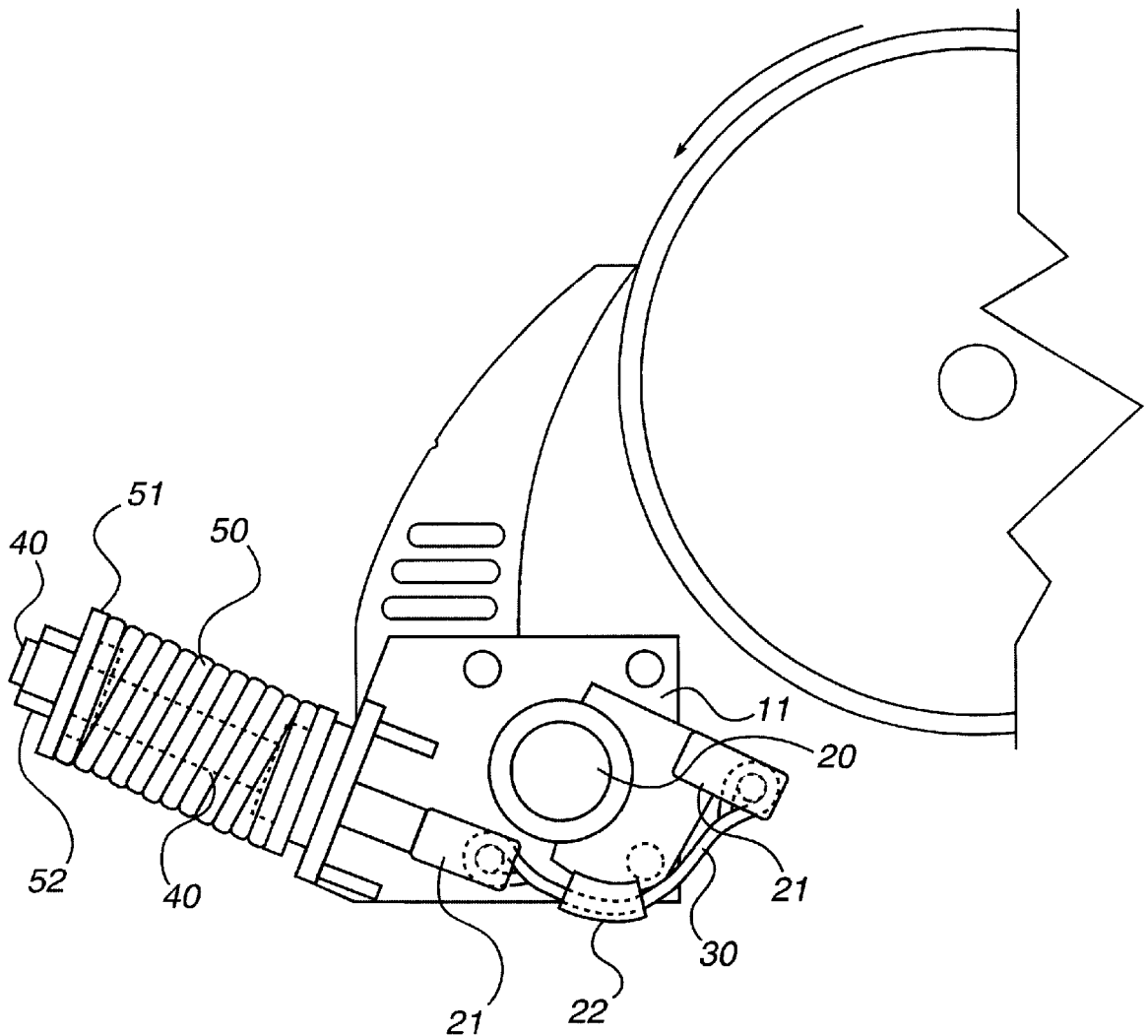
FIG. 4 is a detailed perspective view of a preferred embodiment of the tensioner.
Figure 5:
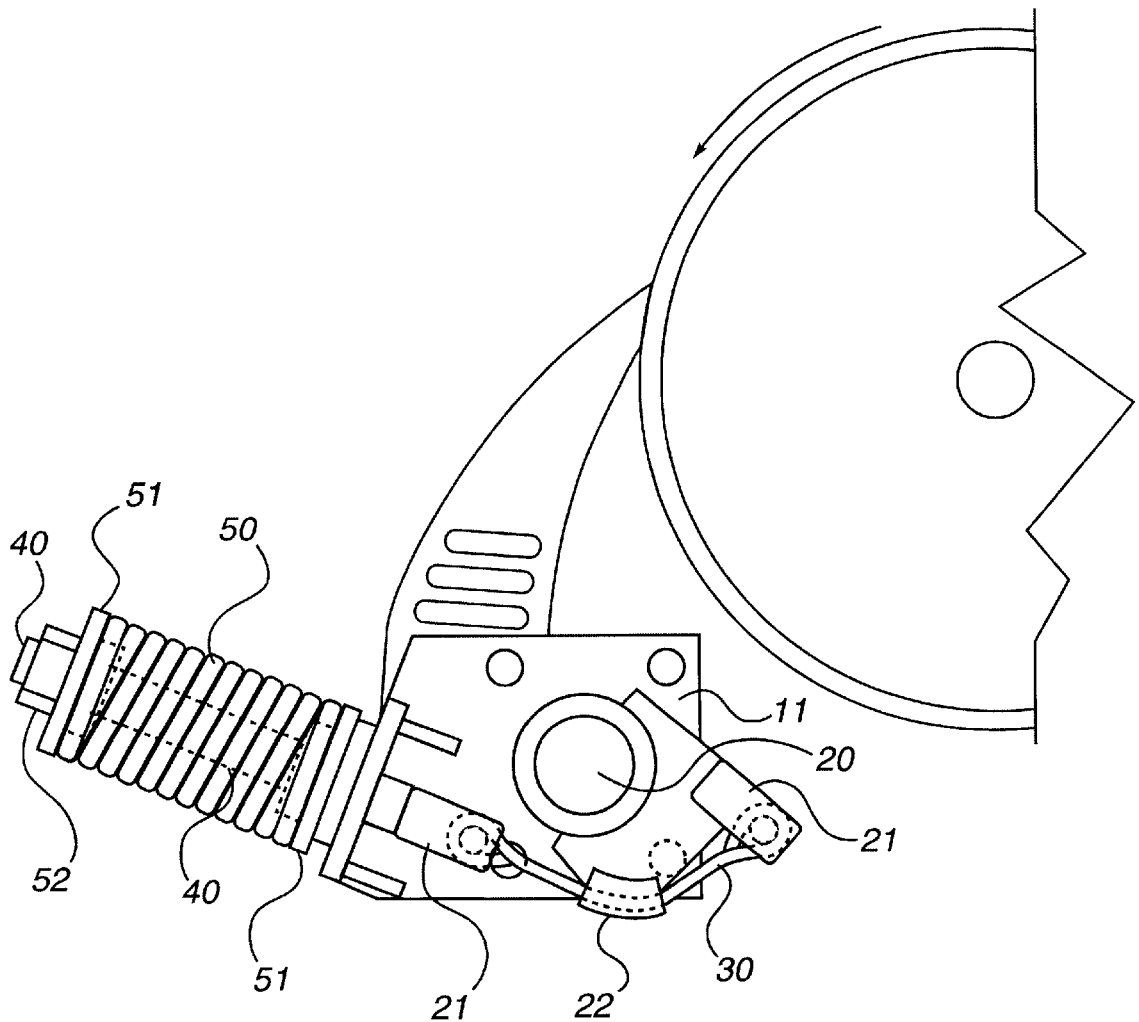
FIG. 5 is a detailed perspective view of a preferred embodiment of the tensioner, exemplifying the rotation of the tensioner with reference to the other portions of the scraper assembly.

With reference to FIGS. 3, 4 and 5, in the preferred embodiment, the tension rod (40) is attached to the pin securing member (21) which, in turn, is attached to the torsion cable (30) by means of the looped end (31) of the torsion cable. The tension rod (40) extends outwardly away from the torsion cam starting at the pin securing member (21). The spring (50) of the present invention is loosely wound around the tension rod and is secured at the opposite end from the tension rod's connection to the torsion cable. In the preferred embodiment, the spring is secured to the rod at the distal end with a jam nut (52) and a set nut. In a more preferred embodiment, a pair of spring retainers (51) surround the tension rod at opposite ends of the tension rod such that the spring is located in between the spring retainers and such that the tension rod may slide easily through the spring retainers. The spring retainers constrain the expansion of the spring (50) and supply a surface against which the spring may push.

The spring (50) is originally compressed when mounted and secured to the tension rod and between the spring retainers (51). Over time, the spring will expand, pushing against the spring retainers, as shown in FIG. 5. Since the bottom spring retainer cannot move in any direction, the spring will force the upper spring retainer to move up and away from the torsion cam. Because the spring is fixedly secured to the top of the tension rod, the tension rod will be pushed by the spring up and away from its connection to the torsion cable. This pushing force on the tension rod creates a pulling force on the torsion cable. The pulling force on the torsion cable will cause the torsion cam to rotate in a clockwise or counter-clockwise manner, depending on the side of the scraper blade assembly on which the cam tensioner is mounted, because of the connection of the torsion cable to the torsion cam. This rotation by the torsion cam, which is secured to the support arm of the scraper blade assembly, causes the support arm to rotate toward the conveyor belt, thus biasing the arm and blades against conveyor belt and increasing the effective torque of the arm against the conveyor belt. FIG. 5 depicts the rotation of the tensioner and the subsequent biasing of the worn scraper blade against the belt.

Figure 6:
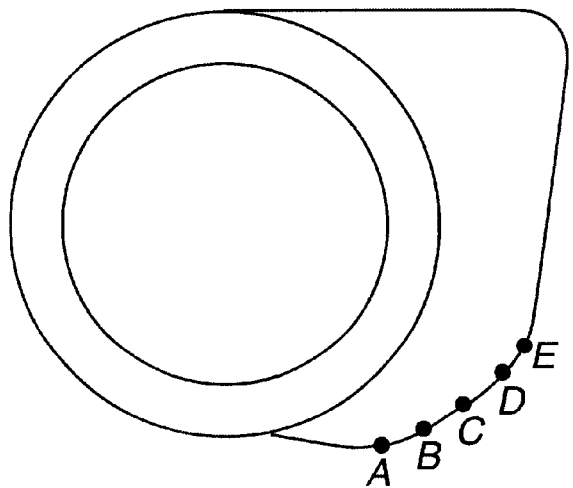
FIG. 6 is a detailed side view of a preferred embodiment of the torsion cam, which further illustrates data points on the cam used in measuring torque arm length as the cam rotates in a clockwise direction.
Figure 7:
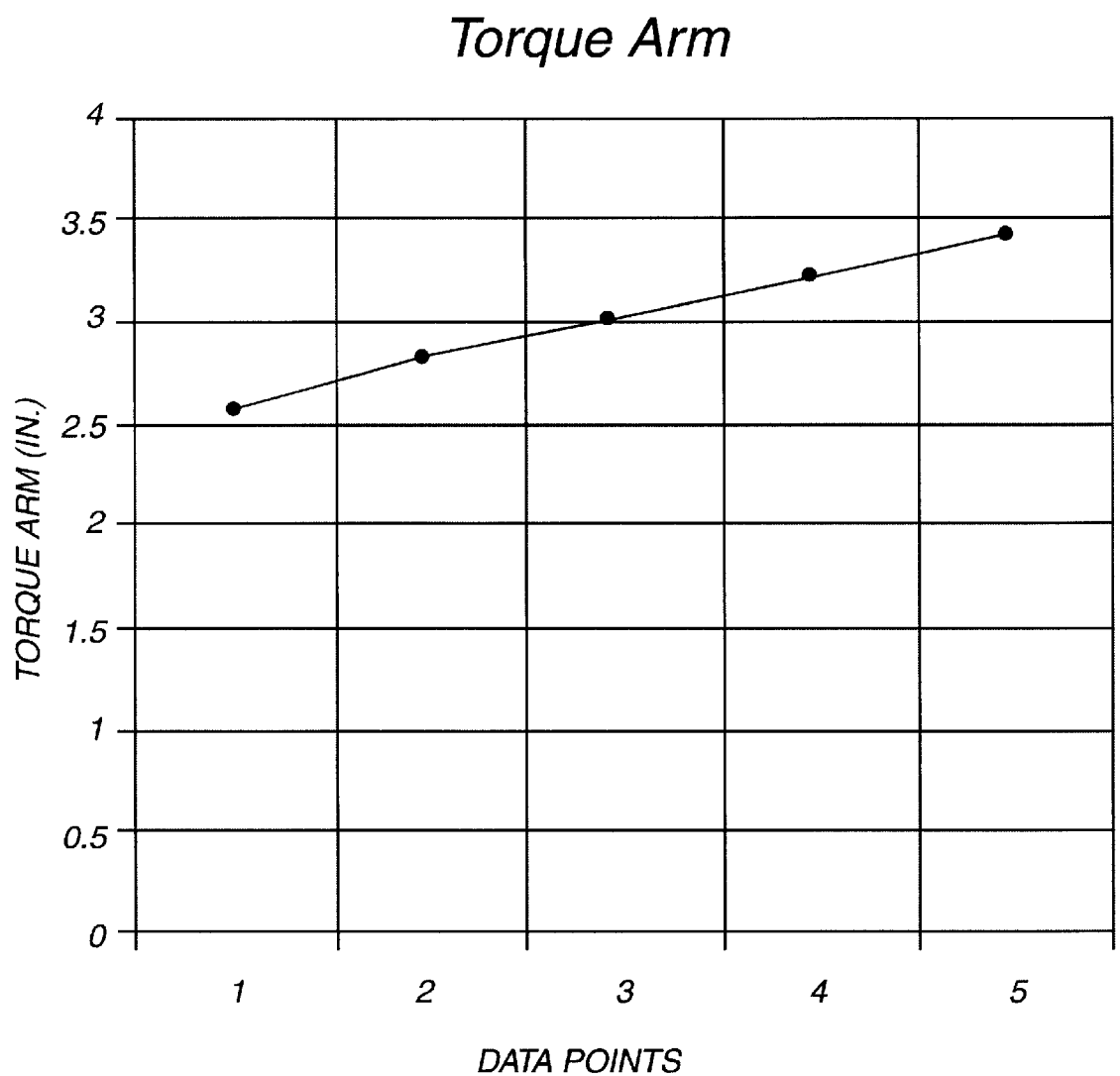
FIG. 7 is a graph depicting the increase in the torque arm length as measured at data points 1, 2, 3, 4, and 5 which correspond to data points A, B, C, D, and E of FIG. 4.
Figure 8:
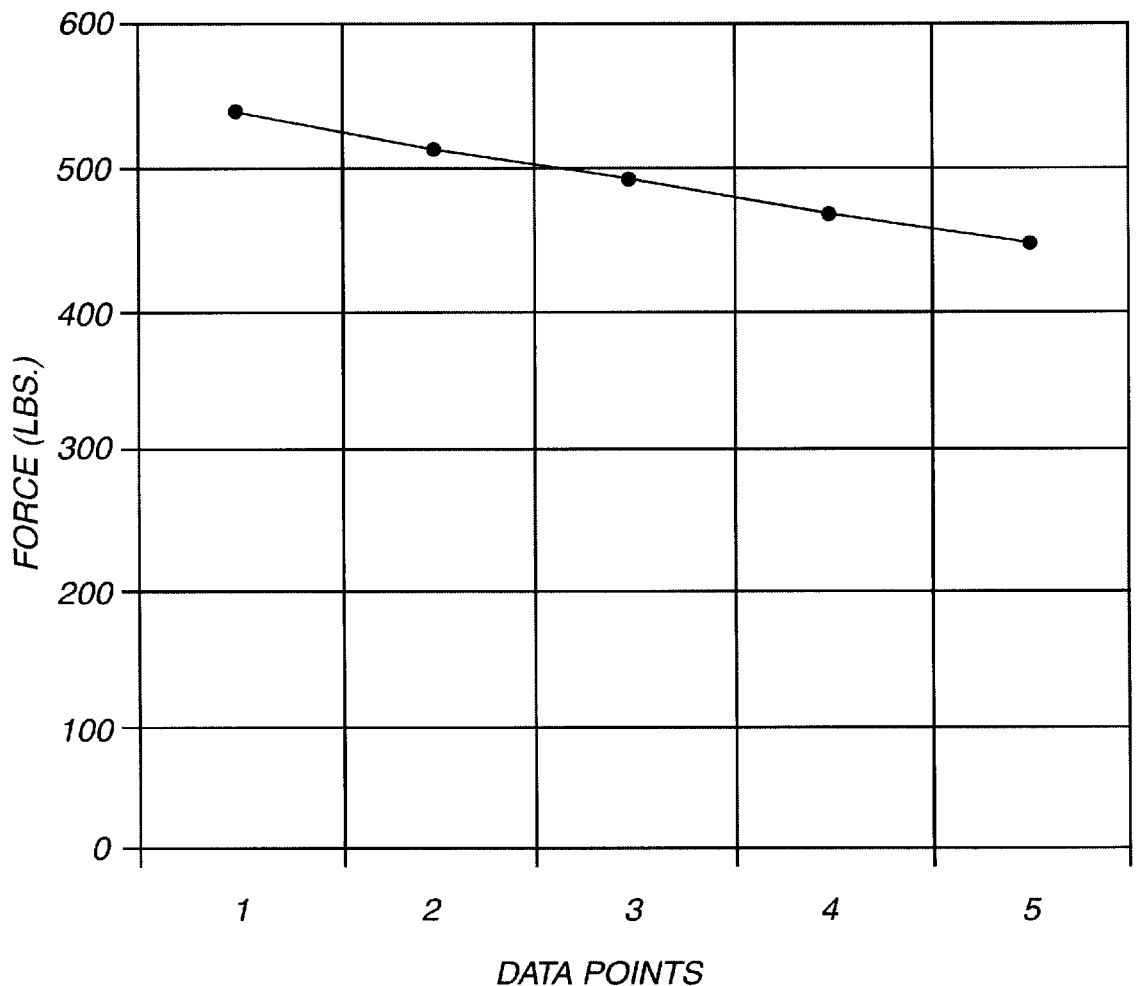
FIG. 8 is a graph depicting the decrease in the spring force as measured at data points 1, 2, 3, 4, and 5 which correspond to data points A, B, C, D, and E of FIG. 4.
Figure 9:
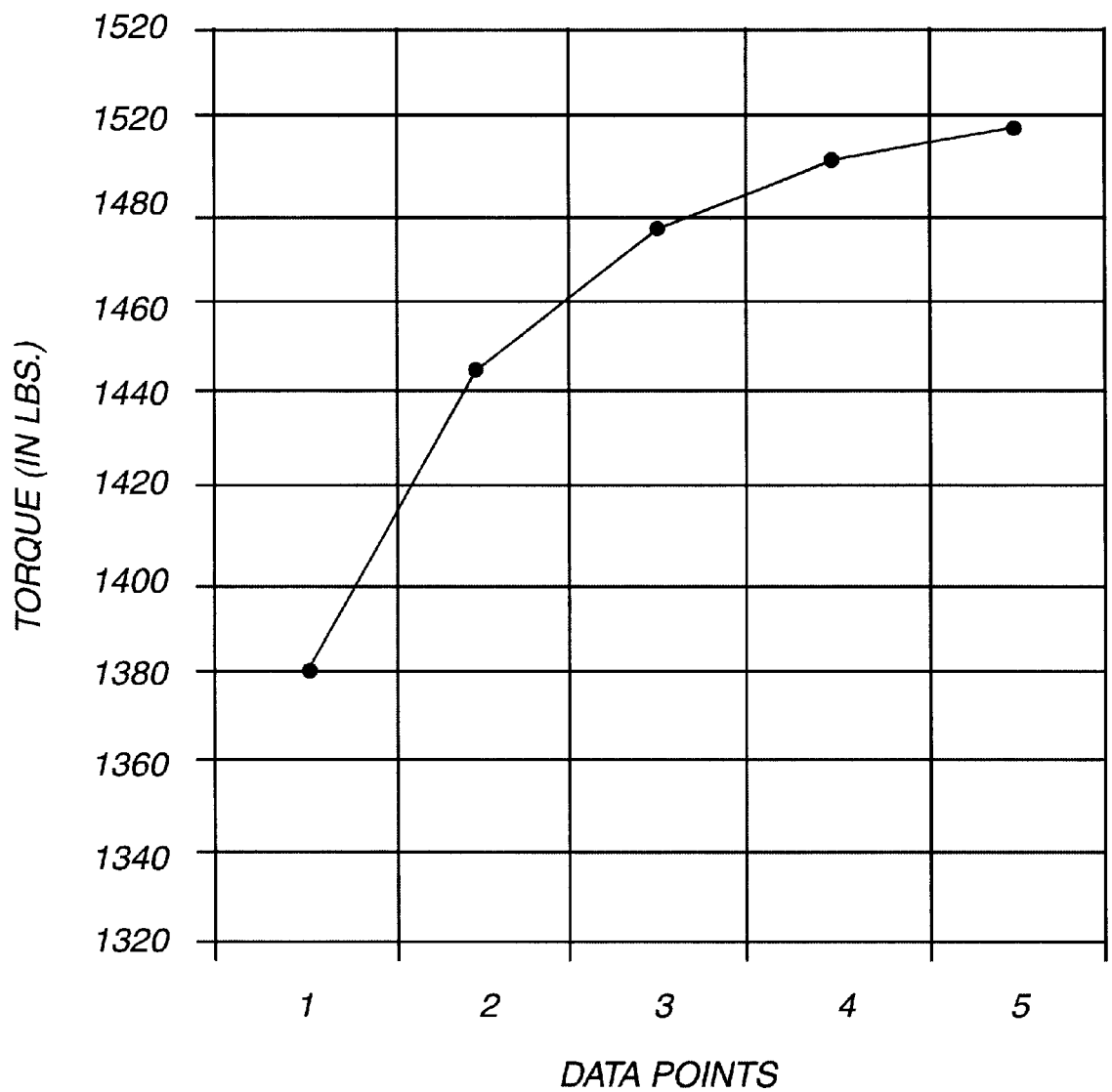
FIG. 9 is a graph depicting the increase in the effective torque as measured at data points 1, 2, 3, 4, and 5 which correspond to data points A, B, C, D, and E of FIG. 4.

FIG. 6 depicts the preferred embodiment of the torsion cam and various points along the curved portion of the torsion cam that have been measured to demonstrate the increase in the torque arm of the present invention as well as the effectiveness of this invention. As the torsion cam is rotated in a clockwise direction, alternatively, along the curve from point E to point A, the chart shows the increase in the torque arm from 2.446 to 3.278 inches and the decrease in the spring force from 537 lbs. to 440.2 lbs. This increase in the torque arm, or the increase in the distance from the rotational center of the cam to the point where the cable last engages the cam, results in the torsion cam supplying more biasing force to the arm and blades of the scraper assembly and, thus, an increase in the effective torque from 1381 in-lb. to 1498 in-lb. FIGS. 7 through 9 depict graphically the information contained in the chart of FIG. 6. FIG. 7 shows the increase in the torque arm (or the distance from the rotational center of the cam to the point where the torsion cable last engages the torsion cam) when the cam is rotated. FIG. 8 shows the decrease in the spring force over time. FIG. 9 shows the increase in effective torque that results from the rotation of the torsion cam and the resultant increase in the torque arm, accounting for the decrease in the spring force. The reader should understand that these numbers are used for illustrative purposes only; the effective increase in torque can vary dependent on factors such as the strength of the spring and the shape of the cam.

Although, for convenience, the apparatus of the present invention has been described hereinabove primarily with respect to its preferred embodiments, it will be apparent to those skilled in the art that the invention applies to many types of scraper blade assemblies and that many variations of this invention can be made without departing from the spirit of the invention as claimed.

What is claimed is:

1. A self-adjusting tensioning apparatus comprising:
    a cam having a shaft portion and a flange portion, said shaft portion having an axis of rotation and operatively arranged to carry said flange portion;
    a cable having a first end and a second end; said cable frictionally engaging said flange portion of said cam, said first end of said cable removably secured to said flange portion of said cam;
    a rod removably secured to said second end of said cable; and,
    a spring operatively arranged to carry said rod; said shaft portion rotating in response to expansion of said spring.

2. A self-adjusting tensioning apparatus according to claim 1 further comprising:
    a first pin member fixedly secured to said rod and engaging said second end of the cable; and,
    a second pin member fixedly secured to said cam and engaging said first end of the cable.

3. A self-adjusting tensioning apparatus according to claim 1 further comprising:
    a plurality of spring retainers at opposite ends of the spring; said retainers operatively arranged to constrain the expansion of the spring and provide surfaces against which the spring may push.

4. A self-adjusting tensioning apparatus according to claim 1 further comprising:

a spring retainer at one end of the spring; said retainer operatively arranged to constrain the expansion of the spring and provide a surface against which the spring may push.

5. A self-adjusting tensioning apparatus according to claim 1 further comprising:

a guide member abutting said cable and operatively arranged to bias said cable against said cam.

6. A self-adjusting tensioning apparatus for an assembly including at least one scraper blade comprising:

a cam having a shaft portion and a flange portion, said shaft portion having an axis of rotation and operatively arranged to carry said flange portion, said cam operatively engaging said assembly;

a cable having a first end and a second end and frictionally engaging said cam;

said first cable end removably secured to said flange portion of said cam;

a rod removably secured to said second end of said cable; and, a spring operatively arranged to carry said rod; said cam and said at least one scraper blade rotating in the same direction in response to said relaxation of said spring.

7. A self-adjusting tensioning apparatus for an assembly including at least one scraper blade according to claim 6 further comprising:

a first pin member fixedly secured to said rod and engaging said second end of the cable; and, a second pin member fixedly secured to said cam and engaging said first end of the cable.

8. A self-adjusting tensioning apparatus for an assembly including at least one scraper blade according to claim 6 further comprising:

a plurality of spring retainers at opposite ends of the spring; said retainers operatively arranged to constrain the expansion of the spring and provide surfaces against which the spring may push.

9. A self-adjusting tensioning apparatus for an assembly including at least one scraper blade according to claim 6 further comprising:

a spring retainer at one end of the spring; said retainer operatively arranged to constrain the expansion of the spring and provide a surface against which the spring may push.

10. A self-adjusting tensioning apparatus for an assembly including at least one scraper blade according to claim 6 further comprising:

a guide member abutting said cable and operatively arranged to bias said cable against said cam.

11. A self-adjusting tensioning apparatus for an assembly including at least one scraper blade comprising:

a cam operatively engaging said assembly;

a cable having a first end and a second end and frictionally engaging said cam;

said first cable end removably secured to said cam;

a rod removably secured to said second end of said cable;

a spring operatively arranged to carry said rod; said cam moving in response to expansion of the spring and biasing said at least one scraper blade against a conveyor belt.

12. A self-adjusting tensioning apparatus for an assembly including at least one scraper blade according to claim 11 further comprising:

a first pin member fixedly secured to said rod and engaging said second end of the cable; and, a second pin member fixedly secured to said cam and engaging said first end of the cable.

13. A self-adjusting tensioning apparatus for an assembly including at least one scraper blade according to claim 11 further comprising:

a plurality of spring retainers at opposite ends of the spring; said retainers operatively arranged to constrain the expansion of the spring and provide surfaces against which the spring may push.

14. A self-adjusting tensioning apparatus for an assembly including at least one scraper blade according to claim 11 further comprising:

a spring retainer at one end of the spring; said retainer operatively arranged to constrain the expansion of the spring and provide a surface against which the spring may push.

15. A self-adjusting tensioning apparatus for an assembly including at least one scraper blade according to claim 11 further comprising:

a guide member abutting said cable and operatively arranged to bias said cable against said cam.

* * * * *